United States Patent [19]

Iwano

[11] Patent Number: 4,653,011
[45] Date of Patent: Mar. 24, 1987

[54] METHOD OF MEASURING BY COORDINATE MEASURING INSTRUMENT AND COORDINATE MEASURING INSTRUMENT

[75] Inventor: Hideo Iwano, Kawasaki, Japan
[73] Assignee: Mitutoyo Mfg. Co., Ltd., Tokyo, Japan
[21] Appl. No.: 716,717
[22] Filed: Mar. 27, 1985

[30] Foreign Application Priority Data

Oct. 29, 1984 [JP] Japan .................. 59-227532

[51] Int. Cl.⁴ .................. G06F 15/46; G01B 5/20
[52] U.S. Cl. .................. 364/513; 33/503; 33/504; 364/560; 901/44; 901/46
[58] Field of Search .................. 364/167–171, 364/474, 475, 560, 579, 580, 513, 550, 551; 219/124.34; 901/9, 10, 44, 46; 414/730; 33/503, 504, 505, 545–547, 558

[56] References Cited

U.S. PATENT DOCUMENTS

| | | | |
|---|---|---|---|
| 3,727,119 | 4/1973 | Stanley et al. | 318/568 |
| 3,840,993 | 10/1974 | Shelton | 33/189 X |
| 4,138,822 | 2/1979 | Parodi | 33/169 R X |
| 4,168,576 | 9/1979 | McMurtry | 33/174 L |
| 4,365,301 | 12/1982 | Arnold et al. | 364/560 X |
| 4,428,055 | 1/1984 | Zurbrick et al. | 364/560 X |
| 4,437,151 | 3/1984 | Hurt et al. | 364/560 X |
| 4,484,293 | 11/1984 | Minucciani et al. | 364/560 X |
| 4,485,453 | 11/1984 | Taylor | 364/560 X |

Primary Examiner—Joseph Ruggiero
Attorney, Agent, or Firm—Flynn, Thiel, Boutell & Tanis

[57] ABSTRACT

This invention relates to a method of measuring by a coordinate measuring instrument and the coordinate measuring instrument, wherein a probe to be brought into abutting contact with a work to be measured is moved in two- or tri-dimensional direction by a robot mechanism provided independently of a main body of measuring instrument. A moving path of the robot mechanism is preset, and, when a command to carry out a predetermined measuring program is given from a data processing unit, the robot mechanism is moved in accordance with the moving path, and a measured result is calculated to seek a dimension of the work, on the basis of measured data given through an abutting contact between the probe and the work.

13 Claims, 6 Drawing Figures

METHOD OF MEASURING BY COORDINATE MEASURING INSTRUMENT AND COORDINATE MEASURING INSTRUMENT

BACKGROUND OF THE INVENTION

1. Field of the Invention

This invention relates to a method of measuring by a coordinate measuring instrument and a coordinate measuring instrument, and is concerned with a measuring method utilized when dimensions, contour and the like of a work to be measured are measured by the coordinate measuring instrument rapidly and with high accuracy.

2. Description of the Prior Art

To measure dimensions, contour and the like of a work, which has a complicated contour, in general, coordinate measuring instruments have been widely used.

One of the coordinate measuring instruments, for example, as the tri-dimensional measuring instruments, the following two types are known. Namely, one of those is a manual type, wherein an operator grasps a probe or a portion close to the probe, successively brings the probe into abutting contact with a measuring surface of the work in accordance with predetermined measuring steps, and the dimensions, contour and the like of the work are sought from a displacement value of the probe at the time of contact. The other is an automatic type, for example, a CNC (Computer Numerical Control) tri-dimensional measuring instrument, wherein a main body of a measuring instrument is provided thereon with driving means such as a screw and motor for moving the probe in respective directions of X-, Y- and Z-axes, and the probe is successively brought into abutting contact with the measuring surface of the work while these driving means are automatically controlled in accordance with previously programmed steps.

The former type is simplified in construction, whereby there are few factors affecting the measuring accuracy due to the construction, so that a measured value with high accuracy can be advantageously obtained. On the contrary, the following disadvantages are presented. Namely, (1) since the operator must remember all of the portions to be measured and all of the steps with every work, a mistaken operation tends to occur. Moreover, this situation changes with every work.

(2) Simultaneously with the above, operations associated with a data processing unit are needed, whereby specialized and technical knowledge is required from the operator. In consequence, it cannot be said everybody can perform the operations. As viewed from the mode of measuring, the specialist is occupied by the measuring instrument and cannot be utilized for any other operation. Furthermore, it is difficult to gather many such specialists.

(3) With a large-sized measuring instrument permitting a large measuring scope, when all of the measuring points of the work are measured, the measurer should move around the measuring instrument or operate the measuring instrument from a measuring stand, whereby the measuring efficiency is lowered and the safety lacks.

(4) When the operating time period is extended, the temperature of the body is imparted from hand to the probe and the like, with the result that the measuring accuracy may be lowered due to the thermal expansion of the probe and the like.

In contrast thereto, the latter type is suitable for the repeated measurements of works, which are identical with one another. On the contrary, in order to automatically move the probe in the directions of X-, Y- and Z-axes, driving means such as a screw, motor and the like should be mounted to a main body of the measuring instrument, particularly to a slider supporting a probe shaft, and further, to a beam supporting the slider, whereby the construction for supporting the above-described members cannot but be large-sized. Then, distortions and deflections are caused to the structure of the foundation with the increase in the weight of the above-described members, with the result that the measuring accuracy is disadvantageously lowered.

The above-described disadvantages of both types are true of the two-dimensional measuring instruments as well as the tri-dimensional measuring instruments.

SUMMARY OF THE INVENTION

The present invention has been developed to obviate the above-described disadvantages of the prior art and has as its object the provision of a method of measuring by a coordinate measuring instrument and the coordinate measuring instrument, wherein dimensions, contour and the like of a work are rapidly measured with high accuracy in accordance with the predetermined steps with all of the disadvantages of the manual type and automatic type measuring instruments being obviated.

To this end, the present invention contemplates that movement of a detecting element such as a touch signal probe movable in two- or tri-dimensional direction through a moving mechanism is performed by a robot mechanism independent of the main body of measuring instrument, i.e. driving means for automatization are independently provided, whereby the disadvantages of the manual and automatic type measuring instruments are obviated, while, the detecting element is moved by the robot mechanism in accordance with a measuring step program of a data processing unit, a moving path data of the robot mechanism at this time is stored, and the robot mechanism is operated while the moving path data thus stored is successively read in accordance with the measuring step program of the data processing unit.

More specifically, the measuring method according to the present invention is a measuring method by use of a coordinate measuring instrument including a moving mechanism for moving a detecting element to be in contact with a work, which is rested on a mount, in two- or tri-dimensional direction, a displacement detector for detecting a displacement value of the detecting element and a data processing unit for processing an output signal from the displacement detector in a predetermined manner to seek dimensions and the like of the work. This measuring method comprises:

a detecting element moving step storing process, wherein the detecting element is moved by the robot mechanism independent of the main body of the measuring instrument through the moving mechanism in accordance with a measuring step program including a plurality of steps preset in the data processing unit, while a moving path of the robot mechanism is stored by a robot operating command unit;

a measured data fetch process, wherein the robot mechanism is operated to bring the detecting element into contact with the work in accordance with the moving path data stored in the robot operating command unit in response to a step exciting command of the measuring step program, and simultaneously, an output signal from the displacement detector is fetched into the data processing unit; and a measured value calculating process, wherein dimensions and the like of the work are calculated on the basis of measured data fetched by the measured data fetch process, and, upon the completion of the calculation, a succeeding step exciting command is delivered to the robot operating command unit. This measuring method features that the measured data fetch process and the measured data calculating process are repeat, automatically over all the steps of the measuring step program.

According to the present invention, in the coordinate measuring instrument including the moving mechanism for moving the detecting element to be in contact with the work, which is rested on the mount, in two- or tri-dimensional direction, a displacement detector for detecting a displacement value of the detecting element and the data processing unit for processing an output signal from the displacement detector in the predetermined manner to seek dimensions and the like of the work, the measuring instrument comprises a robot mechanism connected to the moving mechanism through a connecting arm thereof and independent of the main body of the measuring instrument for moving the detecting element in a two- or tri-dimensional direction through the moving mechanism, and a robot operating command unit having a function of storing a moving path of the robot mechanism when the detecting element is moved in accordance with the measuring step program including the plurality of steps preset in the data processing unit and another function of automatically operating the robot mechanism in accordance with the moving path data stored, and the robot operating command unit features that the unit is adapted to automatically operate the robot mechanism by a value of the moving path data corresponding to the step in response to a succeeding step exciting command generated upon calculation of the dimensions and the like by the data processing unit.

BRIEF DESCRIPTION OF THE DRAWINGS

FIGS. 1 to 5 show one embodiment of the present invention, in which:

FIG. 1 is the general perspective view,

FIG. 2 is a side view illustrating the essential portions of the robot mechanism, FIG. 3 is a sectional view enlargedly illustrating a connecting portion between a swingable arm and a connecting arm, FIG. 4 is a block diagram illustrating a circuit arrangement, and FIG. 5 is a flow chart illustrating the processing operations of the data processing unit and of the robot operating command unit.

DETAILED DESCRIPTION OF THE PREFERRED EMBODIMENT

Figure 1:
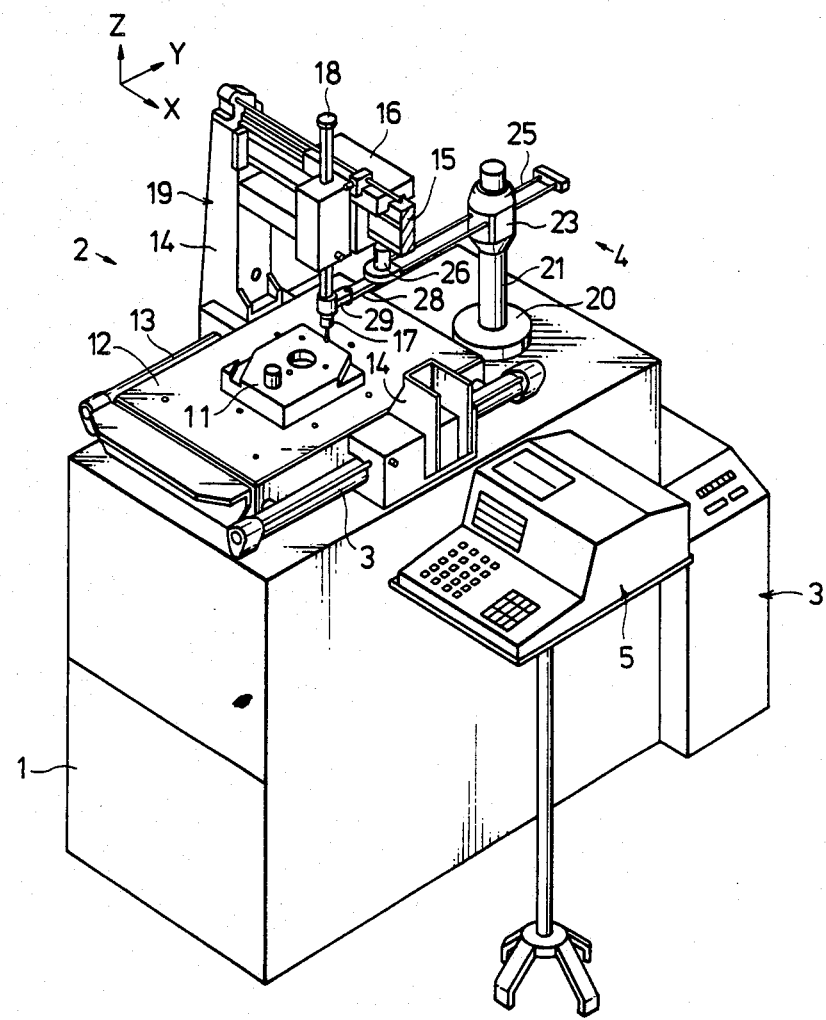

FIG. 1 shows the outer appearance of a measuring system of this embodiment using a tri-dimensional measuring instrument. Referring to this drawing, provided on the top surface of an installation base 1 are a main body of a tri-dimensional measuring instrument 2 and a robot mechanism 4 provided independently of the tri-dimensional measuring instrument 2, for being operated in response to an operating command from a robot operating command unit 3. Additionally, measured data measured by the main body of the tri-dimensional measuring instrument 2 are delivered to a data processing unit 5, where the measured data are processed in a predetermined manner, and thereafter, after, outputted as a value indicating a dimension or a shape of a work to be measured.

The main body of the tri-dimensional measuring instrument 2 is provided at opposite sides of a mount 2 having rested thereon the work 11 through guide rails 13, respectively, with supports 14 being movable in the longitudinal direction of the mount 12 (direction of Y-axis), along a horizontal beam 15 racked across the both supports 14 with a slider 16 being movable in the lateral direction of the mount 2 (direction of X-axis), and at the bottom end of this slider 16 with a probe shaft 18 having a signal probe 17 as being a detecting element, being movable in the vertical direction of the mount 12 (direction of Z-axis). Here, a moving mechanism 19 consisting of the supports 14, slider 16, probe shaft 18 and the like can move the touch signal probe 17 in tri-dimensional directions through a relatively light force by use of an air bearing or the like for example. With this arrangement, during movement of the touch signal probe 17, when the touch signal probe 17 comes into contact with the work 11, positions of the supports 14 in the direction of Y-axis, a position of the slider 16 in the direction of X-axis and a position of the probe shaft 18 in the direction of Z-axis are delivered to the data processing unit 5, where measured data are processed in a predetermined manner, and thereafter, digitally indicated as the measured value.

Figure 2:
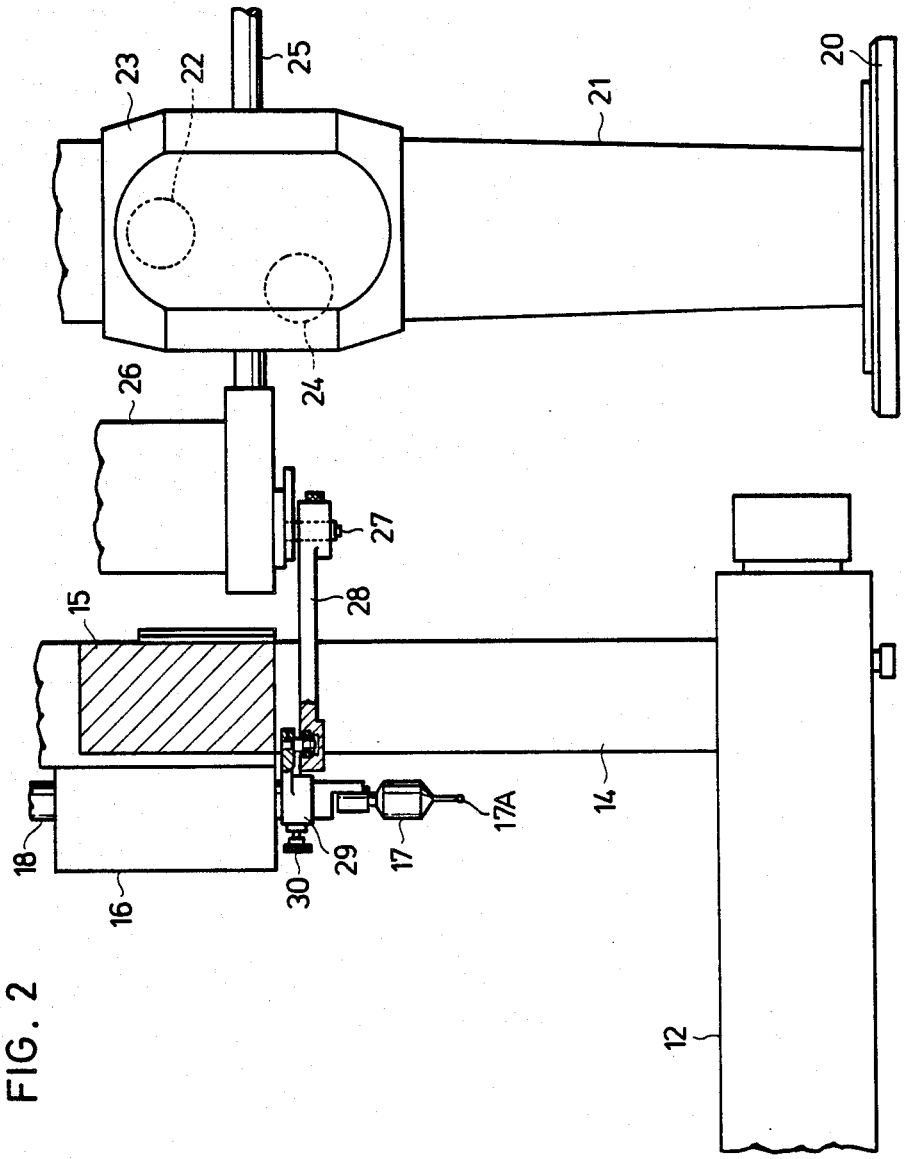
Figure 3:
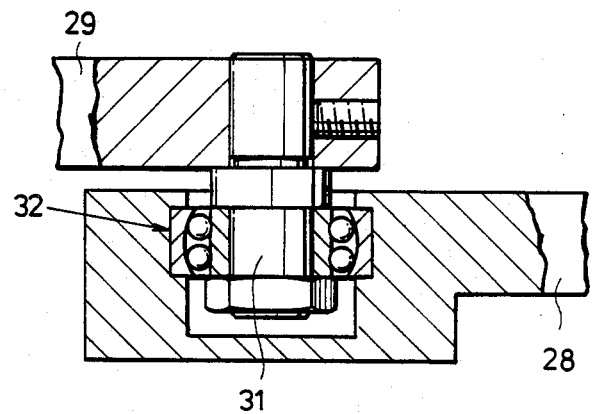

As shown in FIG. 2, the robot mechanism 4 includes: a Z shaft 21 vertically erected on a base 20 fixed onto the top surface of the mount 1; a vertically movable block 23 provided on this Z shaft in a manner to be vertically movable by the driving of a Z-axis driving motor 22 in the direction of Z-axis; two linearly movable rods 25 as being a linearly movable means provided on this vertically movable block 23, being parallel to each other and linearly movable by the driving of a Y-axis driving motor 24 in the direction of Y-axis; a rotary shaft 27 provided at the ends of the two linearly movable rods 25 on one side, being in parallel to the Z-axis and rotatable by the driving of a swingable driving motor 26; a swingable arm 28 fixed at a proximal end thereof to the rotary shaft 27; and a connecting arm 29 for connecting the forward end of this swingable arm 28 and the probe shaft 18 disposed adjacent the touch signal probe 17 to each other. The connecting arm 29 is fixed at one end thereof on the side of the probe shaft 18 to the probe shaft 18 through a set-screw 30 and rotatably connected at the other end thereof on the side of the swingable arm 28 to the swingable arm 28 in a manner to be rotatable, through a connecting shaft 31 and a bearing 32 (Refer to FIG. 3). With this arrangement, the touch signal probe 17 can be moved in the tri-dimensional directions by the operation of the robot mechanism 4 through the moving mechanism 19.

Figure 4:
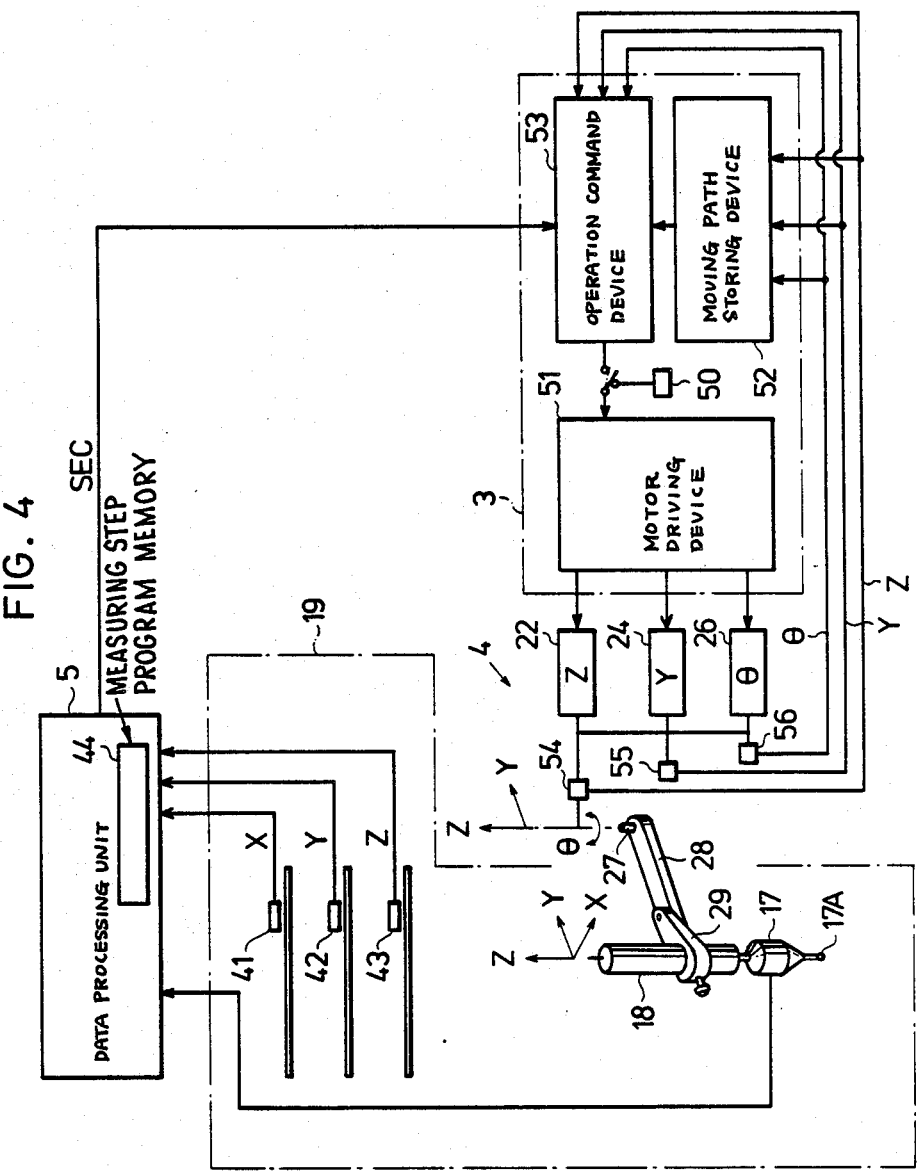

FIG. 4 shows the circuit arrangement of this measuring system. Referring to this drawing, designated 41 is an X-axis displacement detector for detecting a displacement value of the slider 16 in the direction of X-axis, i.e. a displacement value of the touch signal probe 17 in the direction of X-axis, 42 a Y-axis displacement detector for detecting a displacement value of one of the supports 14 in the direction of Y-axis, i.e. a displacement value of the touch signal probe 17 in the direction of Y-axis, and 43 is a Z-axis displacement detector for detecting a displacement value of the probe shaft 18 in the direction of Z-axis, i.e. a displacement value of the touch signal probe 17 in the direction of Z-axis. Measured data of the touch signal probe 17 in the directions of X-, Y- and Z-axes as detected by these displacement detectors 41, 42 and 43 are obtained in such a manner that a measuring element 17A of the touch signal probe 17 comes into contact with the work 11, and, when a touch signal from the touch signal probe 17 is delivered to the data processing unit 5, the data is fetched into the data processing unit 5.

The data processing unit 5 has a measuring step program memory 44 for storing a measuring step program including a plurality of steps, in which the measuring steps are preset, in addition to memories for storing the measured data delivered from the displacement detectors 41, 42 and 43, and a memory for storing a calculating process program to perform calculations in accordance with a measuring mode on the basis of the measured data stored in the above-described memories. The data processing unit 5 carries out the processing of a flow chart shown to the left from a chain line in FIG. 5 in accordance with the measuring step program stored in this measuring step program memory 44.

More specifically, the data processing unit 5 gives a step exciting command SEC to the robot operating command unit 3 in accordance with the measuring step program stored in the measuring step program memory 44, whereby the robot mechanism 4 performs a predetermined operation in response to the command from the robot operating command unit 3. During this operation, if a predetermined number of measured data from the displacement detectors 41, 42 and 43 are inputted, then the data processing unit 5 carries out calculations on the basis of these measured data, and thereafter, gives a succeeding step exciting command to the robot operating command unit 3. The processes are repeated over all the steps of the measuring step program stored in the measuring step program memory 44.

The robot operating command unit 3 includes: a motor driving device 51 for driving the Z-axis driving motor 22, Y-axis driving motor 24 and swingable driving motor 26; a moving path storing device 52 for storing a moving path of the robot mechanism 4, i.e. a moving path of the touch signal probe 17; an operation command device 53 for driving the Z-axis driving motor 22, Y-axis driving motor 24 and swingable driving motor 26 on the basis of moving path data stored in the moving path storing device 52 when the step exciting command SEC is given from the data processing unit 5; and a joy stick 50 for manually driving the Z-axis driving motor 22, Y-axis driving motor 24 and swingable driving motor 26 through the motor driving device 51. Inputted to both the moving path storing device 52 and the operation command device 53 are: positional data from a Z-axis position detector 54 for detecting a position in the direction of Z-axis of the vertically movable block 23 being vertically movable by the Z-axis driving motor 22; positional data from a Y-axis position detector 55 for detecting positions in the direction of Y-axis of the linearly movable rods 25 being movable by the Y-axis driving motor 24; and angular data from a $\theta$ angle detector 56 for detecting a swing angle of the swingable arm 28 being swingable by the swingable driving motor 26.

Description will hereunder be given of the method of measuring of this embodiment. In making the measurement by use of this system, firstly, the robot mechanism 4 is operated by the control of the joy stick 50 of the robot operating command unit 3, and touch signal probe 17 of the main body of the tri-dimensional measuring instrument 2 is moved in accordance with the measuring step program preset in the measuring step program memory 44 of the data processing unit 5. Then, in the moving path storing device 52 of the robot operating command unit 3, there are successively stored the positional data of the robot mechanism 4 obtained at respective times of movement of the touch signal probe 17, i.e. the positional data in the direction of Z-axis detected by the Z-axis position detector 54, the positional data in the direction of Y-axis detected by the Y-axis position detector 55 and the angular data detected by the $\theta$ angle detector 56. In short, the moving path of the robot mechanism 4, when the touch signal probe 17 moves in accordance with the measuring step program, is stored in the moving path storing device 52. If this process is carried out over all the steps of the measuring step program stored in the measuring step program memory 44, then, in the moving path storing device 52, there are successively stored the moving path of the robot mechanism 4 corresponding to the respective steps of the measuring step program.

As described above, the moving path of the robot mechanism 4 corresponding to the measuring step program is stored in the moving path storing device 52 of the robot operating command unit 3, and thereafter, the measurement is made.

Figure 5:
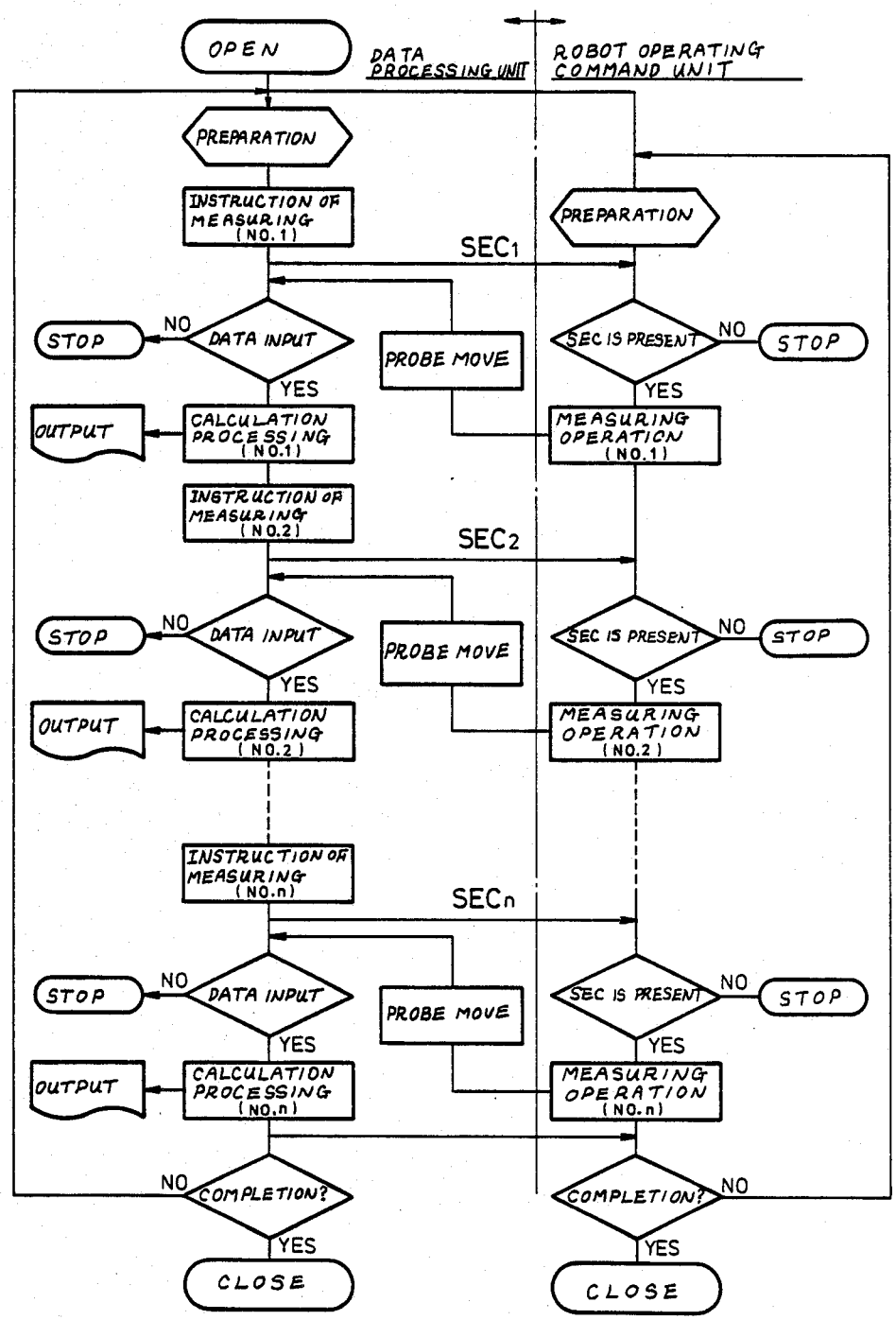

The measurement is made in accordance with the processing of the flow chart shown in FIG. 5. More specifically, when the data processing unit 5 is set at a measuring mode, the processing of preparation is carried out in both the data processing unit 5 and the robot operating command unit 3, thereafter, in the data processing unit 5, a first step out of the measuring step program stored in the measuring step program memory 44, i.e. a first item of measurement is instructed, and a step exciting command SEC, corresponding to this item of measurement is given to the operation command device 53 of the robot operating command unit 3.

When the step exciting command $SEC_1$ is given from the data processing unit 5, the operation command device 53 of the robot operating command unit 3 reads out the moving path data corresponding to the step exciting command $SEC_1$, from the moving path storing device 52, and drives Z-axis driving motor 22, Y-axis driving motor 24 and swingable driving motor 26 through the motor driving device 51 in accordance with this moving path data. Then, the touch signal probe 17 is moved through the robot mechanism 4. When the movement of the touch signal probe 17 brings the touch signal probe 17 into contact with the work 11, a touch signal is given from the touch signal probe 17 to the data processing unit 5. At this time, there are fetched into the data processing unit 5 positional data in the direction of X-axis detected by the X-axis displacement detector 41, positional data in the direction of Y-axis detected by the Y-axis displacement detector 42 and positional data in the direction of Z-axis detected by the Z-axis desplacement detector 43, respectively.

When a predetermined number of the measured data given by the X-, Y- and Z-axes displacement detectors 41, 42 and 43 are inputted, the data processing unit 5 calculates a dimension or the like of the work 11 on the basis of these measured data, and outputs the result of calculation by a printer or the like for example. Upon completion of this calculation, out of the measuring step program stored in the measuring step program memory 44, a second step, i.e. a second item of measurement is instructed, and a step exciting command $SEC_2$ based on the second item of measurement is given to the operation command device 53 of the robot operating command unit 3.

When the step exciting command $SEC_2$ is given from the data processing unit 5, the operation command device 53 of the robot operating command unit 3 reads out the moving path data corresponding to the step exciting command $SEC_2$ from the moving path storing device 52, and drives the Z-axis driving motor 22, Y-axis driving motor 24 and swingable driving motor 26 through the motor driving device 51 in accordance with the moving path data.

As described above, the measurement is automatically made over all the steps of the measuring step program.

In consequence, according to this embodiment, the touch signal probe 17 is moved by the robot mechanism 4 provided independently of the main body of the tri-dimensional measuring instrument 2, so that both the drawbacks of the measuring instruments of the manual type and the automatic types can be obviated simultaneously. In short, even in the case of a large-sized measuring instrument, the measurer can remotely control the measuring instrument at a predetermined position, so that the measuring accuracy can be improved and safety in measurement can be secured. Moreover, the measurer need not directly grasp the probe or the like, so that the influence of the change in temperature can be minimized. Furthermore, there is no need to provide a screw, motor or the like for moving the touch signal probe 17 on the main body of the tri-dimensional measuring instrument 2, whereby the construction of the measuring instrument is simplified, so that distortions and deflections by the weight can be avoided, thus enabling to make the measurement with high accuracy.

Furthermore, the robot mechanism 4 is operated in accordance with the moving path data stored in the moving path storing device 52 of the robot operating command unit 3, whereby there is no need for the measurer to remember the portions of measurement and steps with every work to be measured as in the measuring instrument of the manual type, thereby enabling to eliminate a possibility of making a mistaken operation. Moreover, if a specialist is caused to make a pattern operation of the robot mechanism 4, and, if the moving path thus obtained is stored in the moving path storing device 52, then the operation can be automatically performed, so that the burden of the specialist can be relieved, thus enabling to expect the rapid spread.

Furthermore, in order to excite the robot mechanism 4, it is only necessary for the data processing unit 5 to give the step exciting command SEC to the operation command device 53 of the robot operating command unit 3. In short, only the data processing unit 5 and the robot operating command unit 3 should be connected to each other by the step exciting command SEC, so that, even when the method is adopted in the conventional manual type tri-dimensional measuring instrument, the arrangement may be achieved easily and economically.

Moreover, it is sufficient to position the robot mechanism 4 with the accuracy of an allowable overstroke ($\approx 10-5$ mm) of the touch signal probe 17, whereby there is no need of providing a high class robot mechanism and the like. In short, the touch signal probe 17 is of such an arrangement that an overstroke within the above-described range is allowable and the touch signal probe 17 can automatically return to a predetermined posture under the free conditions. However, such an advantage inherent in the measuring instrument can be offered that even if the touch signal probe 17 overruns, no measuring error occurs without using a high class robot mechanism because measured data are fetched in response to a touch signal generated at the time of contact. This fact is further advantageous in that the matching therebetween may be not so much strict.

Additionally, in working, the moving mechanism 19 on the side of the main body of the tri-dimensional measuring instrument 2 need not necessarily be limited to have the above-described arrangement, and any one which can move the touch signal probe 17 by a relatively light force in the tri-dimensional directions will do. Similarly, as for the robot mechanism 4, any one, which can make the movement of the moving mechanism 19 in the tri-dimensional directions, may be adopted.

Figure 6:
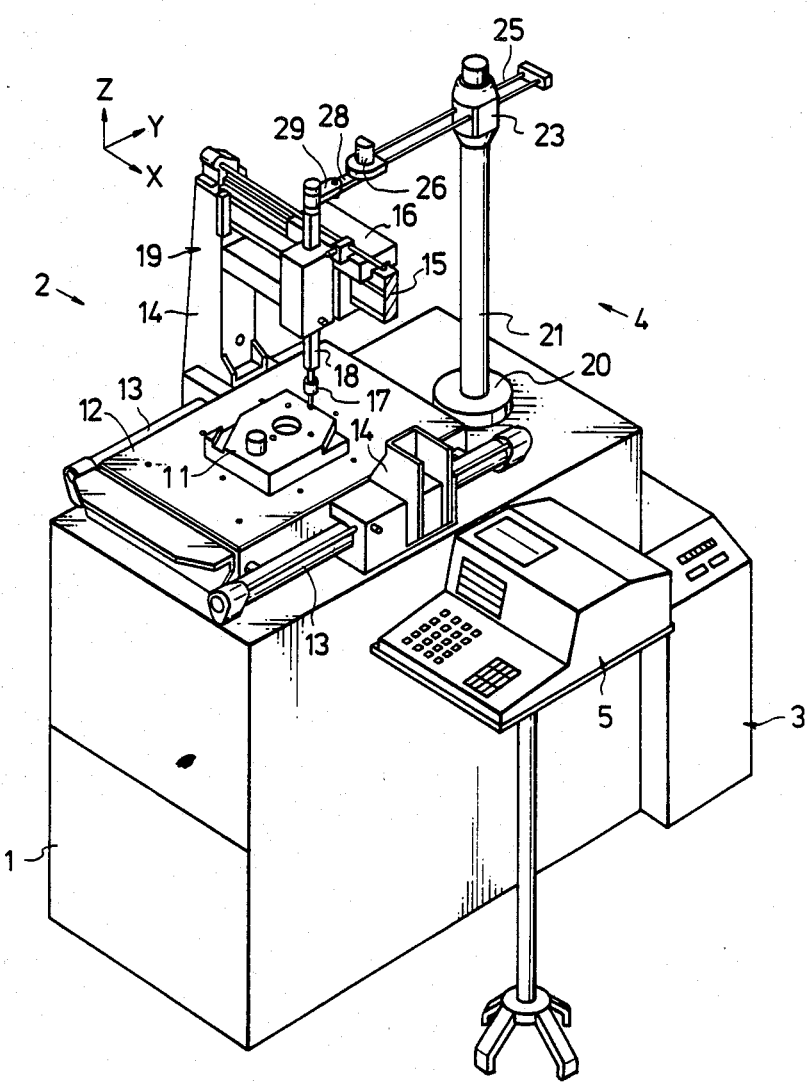
FIG. 6 is a general perspective view showing another embodiment of the present invention.

Furthermore, in the above embodiment, a hand at the forward end of the robot mechanism 4 has been engaged with a portion of the probe shaft 18 adjacent the touch signal probe 17, however, the engagement may be made with the touch signal probe 17 or with an arbitrary position on the probe shaft 18. For example, as shown in FIG. 6, if one end of the connecting arm 29 at the forward end of the robot mechanism 4 is engaged with the upper end of the probe shaft 18, then the respective arms of the robot mechanism 4 do not abut against the work 11, so that the effective measuring scope is not reduced. With this arrangement, the robot mechanism 4 can be disposed at the side of the main body of the measuring instrument 2, so that the space on the mount 12 in the longitudinal direction can be secured.

The robot mechanism 4 has been formed completely separately of the main body of the tri-dimensional measuring instrument 2, however, if no heavy weight burden is applied to the movable portion of the touch signal probe 17, then the robot mechanism 4 may be secured to the mount 12 or may additionally function as the mount for example. The above-described arrangement is advantageous in that the system as a whole can be made compact in size.

The respective driving sources of the robot mechanism 4 need not necessarily be limited to the motors described in the above embodiment, and other power sources such as a hydraulic or pneumatic one may be used for example.

Further, the detecting element need not necessarily be limited to the touch signal probe 17 described in the above embodiment, and may be an optical non-contact detector may be used for example.

Additionally, the present invention need not necessarily be limited to be applied to the tri-dimensional measuring instrument described in the above embodiment, and may be applied to a two-dimensional measuring instrument.

As has been described hereinabove, according to the present invention, all of the disadvantages of the measuring instruments of the manual and automatic types can be obviated, and moreover, a method of measuring by the coordinate measuring instrument and coordinate measuring instrument, wherein rapid and high precision measurement can be made, can be provided.

What is claimed is:

1. A method of measuring by a coordinate measuring instrument including a moving mechanism for moving a decting element in at least one of a two- and a tri-dimensional direction to bring same into contact with a work to be measured rested on a mount, a displacement detector for detecting a displacement value of said detecting element and a data processing unit for processing an output signal from said displacment detector in a predetermined manner to seek dimensions and the like of said work, comprising:

moving said detecting element independent of a main body of a measuring instrument by said moving mechanism in accordance with a measuring step program including a plurality of steps preset in said data processing unit, while, a moving path of a robot mechanism is stored by a robot operating command unit;

operating said robot mechanism during a measured data fetch process to bring said detecting element into contact with said work in accordance with moving path data stored in said robot operating command unit in response to a step exciting command of said measuring step program, and simultaneously, for fetching an output signal of said displacement detector into said data processing unit; and calculating dimensions and the like of said work during a measured value calculating process on the basis of the measured data fetched during said measured data fetch process and giving a succeeding step exciting command to said robot operating command unit upon completion of the calculation; whereby said measured data fetch process and said measured data calculating process are repeated automatically over all the steps of said measuring step program.

2. A method of measuring by a coordinate measuring instrument as set forth in claim 1, wherein the moving path of said robot mechanism is sought from positional data given by detectors for detecting positions of said robot mechanism.

3. A method of measuring by a coordinate measuring instrument as set forth in claim 1, wherein the succeeding step exciting command of said measuring step program is given upon completion of a calculation of a predetermined number of said data fetched into said data processing unit.

4. A method of measuring by a coordinate measuring instrument as set forth in claim 1, wherein a measured result obtained in said measured value calculating process is indicated in print.

5. A coordinate measuring instrument including a moving mechanism for moving a detecting element in at least one of a two- and a tri-dimensional direction to bring same into contact with a work to be measured rested on a mount, a displacement detector for detecting a displacment value of said detecting element and a data processing unit for processing an output signal from said displacement detector in a predetermined manner to seek dimensions and the like of said work, comprising:

a robot mechanism connected to said moving mechanism by a connecting arm thereof and independent of a main body of a measuring instrument for moving said detecting element in at least one of a two- and a tri-dimensional direction through said moving mechanism; and a robot operating command means for storing data defining a moving path of said robot mechanism when said detecting element is moved in accordance with a measuring step program including a plurality of steps preset in said data processing unit and for automatically operating said robot mechanism in accordance with stored data defining said moving path, said robot operating command means being automatically operated by a value of said data defining said moving path which corresponds to a step in response to a succeeding step exciting command generated upon calculation of the dimensions and the like by said data processing unit.

6. A coordinate measuring instrument as set forth in claim 5, wherein said robot mechanism is detachable from said moving mechanism and includes means for moving said detecting element in at least one of a two- and a tri-dimensional direction.

7. A coordinate measuring instrument as set forth in claim 5, wherein said robot mechanism includes:

a shaft provided at a position not interfering with a measuring scope on said mount;

a block vertically movably provided on said shaft;

a linearly movable means provided in a manner to be movable perpendicularly to said shaft;

a swingable arm swingably supported on said linearly movable means; and a connecting arm for connecting said swingable arm to said moving mechanism.

8. A coordinate measuring instrument as set forth in claim 5, wherein said robot mechanism is driven by motor driving.

9. A coordinate measuring instrument as set forth in claim 5, wherein said robot operating command means includes:

a moving path storing device for storing said moving path of said robot mechanism; and an operating command unit for driving said driving device on the basis of moving path data stored, when a step exciting command is given from said data processing unit.

10. A coordinate measuring instrument as set forth in claim 9, wherein said robot operating command means further includes a joy stick for manually driving said robot mechanism.

11. A coordinate measuring instrument as set forth in claim 7, wherein said moving mechanism includes:

a pair of supports provided in a manner to be movable in a direction of Y-axis;

a slider provided in a manner to be movable in a direction of X-axis along a beam racked across said supports; and a probe shaft provided in said slider in a manner to be movable in a direction of Z-axis.

12. A coordinate measuring instrument as set forth in claim 11, wherein the forward end of said connecting arm is fixed to a position relatively close to said detecting element disposed downwardly of said beam.

13. A coordinate measuring instrument as set forth in claim 5, wherein said operating command means compares positional data given by said moving path storing device with positions of said robot mechanism and positional data given by detectors for detecting positions of said robot mechanism, and drives the robot mechanism by a value of a difference therebetween.

* * * * *